United States Patent [19]
Colombo et al.

[11] Patent Number: 5,961,273
[45] Date of Patent: Oct. 5, 1999

[54] STACKER FOR THE STACKING OF METALLIC SECTION BARS IN ALTERNATING, UPRIGHT AND REVERSE LAYERS

[75] Inventors: Ezio Colombo, Cassano Magnago; Marco Rossini, Olgiate Olona, both of Italy

[73] Assignee: Techint Compagnia Tecnica Internazionale S.p.A., Milan, Italy

[21] Appl. No.: 09/166,579

[22] Filed: Oct. 6, 1998

[30] Foreign Application Priority Data

Oct. 6, 1997 [IT] Italy .................................. MI97A2263

[51] Int. Cl.[6] .................................................. B65G 57/18
[52] U.S. Cl. ..................... 414/788.3; 414/742; 414/791.4
[58] Field of Search .................................... 414/737, 742, 414/743, 788.3, 791.4, 793.2

[56] References Cited

U.S. PATENT DOCUMENTS

| | | | |
|---|---|---|---|
| 4,184,800 | 1/1980 | Uchida et al. | 414/791.4 |
| 4,648,770 | 3/1987 | Berz et al. | 414/791.4 X |
| 4,969,313 | 11/1990 | Nonini et al. | 414/791.4 X |
| 5,001,890 | 3/1991 | Mansutti | 414/791.4 X |

FOREIGN PATENT DOCUMENTS

| | | |
|---|---|---|
| 0099863 | 2/1984 | European Pat. Off. . |
| 0196685 | 8/1986 | European Pat. Off. . |
| 0 318 722 | 6/1989 | European Pat. Off. . |
| 0 819 631 | 1/1998 | European Pat. Off. . |
| 2 124 221 | 9/1972 | France . |
| 29 40 416 | 4/1981 | Germany . |
| 34 20 650 | 12/1985 | Germany . |
| 1247451 | 3/1991 | Italy . |

*Primary Examiner*—Janice L. Krizek
*Attorney, Agent, or Firm*—Oblon, Spivak, McClelland, Maier & Neustadt, P.C.

[57] ABSTRACT

A stacker for the stacking of metallic section bars in alternating upright and reverse layers in an orderly manner, in particular of section bars originating from rolling mills by a conveying line which includes a plurality of trolleys equipped with lances capable of moving forward and backward from the reception area of a stack of section bars to a deposition area of the same layer of section bars in an upright position, and a plurality of magnetic heads capable of being actuated to rotate by a first set of actuating members from a picking-up position of another layer of section bars to a depositing position of the same layer of section bars reversed on top of the first layer of upright section bars. According to the invention, each head performs both a vertical shifting motion essentially parallel to itself and an oscillating motion, where the shifting motion is actuated by a second set of actuating mechanisms independent of the first and the said oscillating motion is actuated by a third set of actuating mechanisms also independent of the first set.

6 Claims, 7 Drawing Sheets

Fig. 3

STACKER FOR THE STACKING OF METALLIC SECTION BARS IN ALTERNATING, UPRIGHT AND REVERSE LAYERS

BACKGROUND OF THE INVENTION

1. Field of the Invention

This invention refers to a stacker for the stacking of metallic section bars in alternating straight and reverse layers, in particular of section bars originating from a rolling mill.

2. Discussion of the Background

Those skilled in the art are well familiar with automatic stackers, for example equipped with magnetic heads and auxiliary mechanical devices, capable of stacking metallic section bars originating from a rolling mill or a conveyor, as for example described in the patents EP 0099863, EP 0196685, and EP 0318722.

In these stackers, the rotating heads, generally of a magnetic type, pick up an orderly layer of section bars from a conveying system and position it in a reverse manner on a layer of section bars previously stacked up in an upright manner. This depositing operation occurs on a lowering system arranged in an area reserved for producing the stacks of section bars to be packed.

The rotating heads are generally aided by forward and backward moving trolleys fitted with lances capable, as an alternative to the magnetic heads, of picking up the layers of section bars from the conveying line which must be deposited on the lowering device in an upright position.

In this type of stackers, the rotation of the rotating heads is governed by complex and expensive kinematic devices having, among other things, a rigid geometry.

The mentioned rigidity allows approaching the magnetic heads only up to a certain distance from the last layer of section bars arranged on the lowering device; after this relative approaching motion the stack of section bars is allowed to drop, while demagnetizing the magnetic heads and occasionally employing some expelling devices.

The re-launching and dropping of the section bars from a certain height may lead to a disorderly stacking of the same, and consequently to a poorly assembled package. This is therefore to be avoided for commercial reasons.

Moreover, the potentially improper arrangement of the top layer of section bars may disturb and interfere with the motion of the magnetic heads, with a resulting breakage, jamming problems, and shutdown of the machine. The motion of the magnetic heads is therefore maintained at a certain distance from the top of the layer last deposited on the lowering device, with the result that the deposition of the section bars occurs in an improper manner.

It should also be noted that as the motion of the head carrying a layer of reversed section bars toward a stack of section bars already deposited in an upright manner occurs along an axis not perfectly perpendicular to the plane on which the layer of upright section bars rests, it is not possible to promote the interconnecting of section bars fitted with sections which are difficult to stack.

It should also be highlighted that the known stackers occupy considerable space above the section bars' conveying system. As described in the patent IT 1247451, this encumbrance makes it difficult to access the operating area, both from above or from the sides.

Moreover, the particular complexity of the known kinematic devices used to control the mentioned rotating heads cannot be overlooked. This involves performing numerous operations with a long stacking time, incompatible with the demands on a high productivity of today's and tomorrow's ever more modern rolling mills.

The main object of this invention is to solve the technical problems associated with the known technology, and to produce an automatic stacker capable of depositing, without heavy impacts and in a period of time, a reverse layer of section bars on top of a previously deposited upright layer.

Another object is to avoid a disorderly stacking of the mentioned section bars, resulting in a poor package which may interfere with the motion of the magnetic heads.

Another object of the invention is to produce a stacker equipped with a rotating head maneuvering device of a structurally simple type, capable of not taking up any space above and beside the section bars' conveying line, while at the same time being suitable for an inexpensive production.

These objects are achieved by a stacker provided with the specific characteristics outlined in the attached claims.

BRIEF DESCRIPTION OF THE DRAWINGS

The structural and functional characteristics of this invention and its considerable advantages with respect to the known art will be more readily understood and evident from the following description, referred to the attached drawings, in which.

DESCRIPTION OF THE PREFERRED EMBODIMENTS

In the various figures, the number 10 shows the overall form of a stacker according to the invention, capable of stacking, on top of a lowering device shown in a simplified manner by 11, a plurality of superimposed section bars 12, 12a, 12b, 12c etc., originating from a rolling mill or conveying line, cut to a commercial size. According to this invention, the stacker consists in its general structure of a plurality of rotating heads (13) set side-by-side, as shown in a plan view in FIG. 7. The following description generally refers to only one element composing the stacker 11, which is in turn composed of a plurality of elements arranged side-by-side and entirely similar to each other, as shown in a simplified manner in FIG. 7.

Each head 13 is hinged by a pin 14 to one extremity of an arm 15. The mentioned head 13 may be of either a mechanical or a magnetizable magnetic type.

At the extremity opposite to the pin 14, the arm 15 is hinged in 19 to the free extremity of a lever 16, whose opposite extremity is hinged by a pin 17 to a support 18.

The lever 16 is actuated to oscillate around the pin 17 in the sense of the double-pointed arrow F by a motorized cam 20 acting through a cam follower 21 floating around a pin 22. This makes it possible to determine a vertical shifting of the head 13 in the direction of the double-pointed arrow V, essentially parallel to itself.

Figure 3:
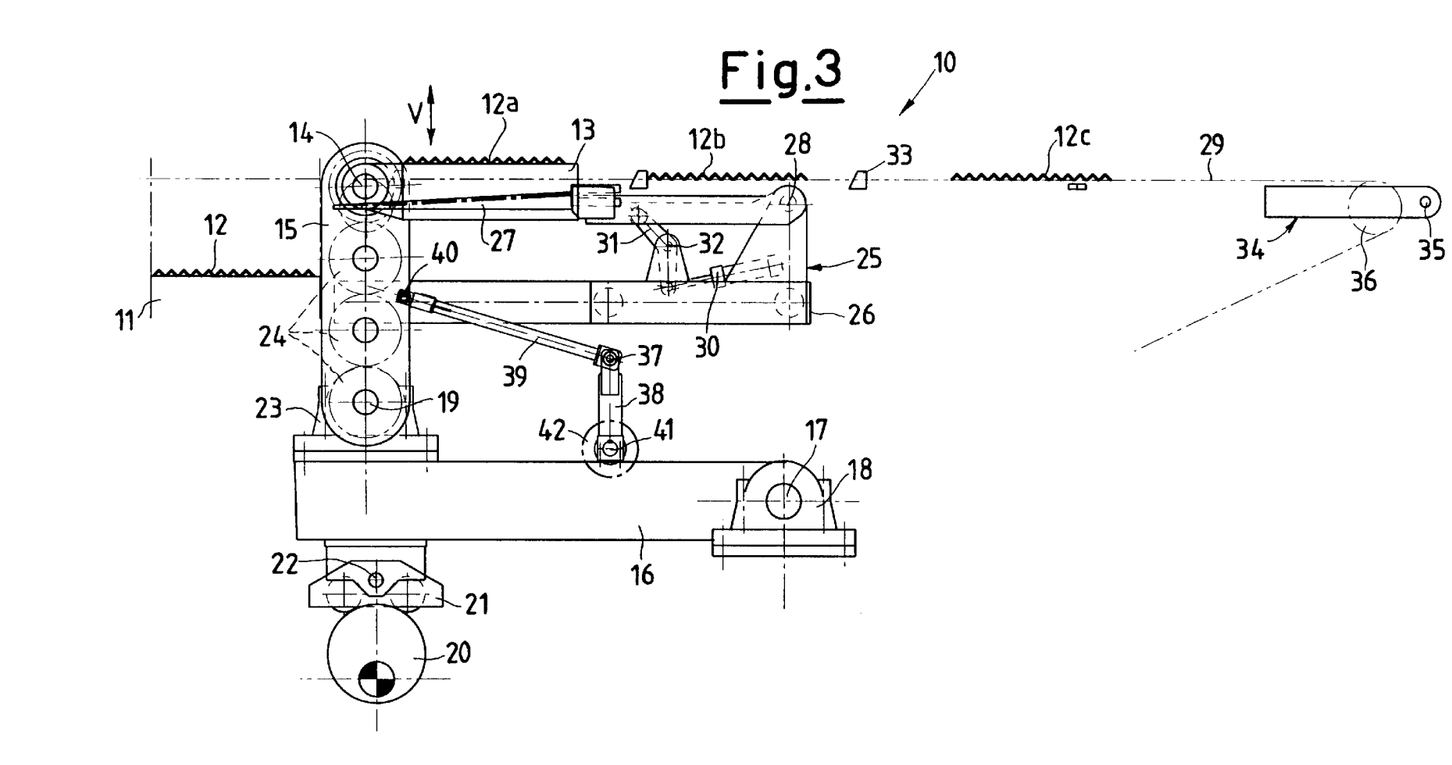
Figure 4:
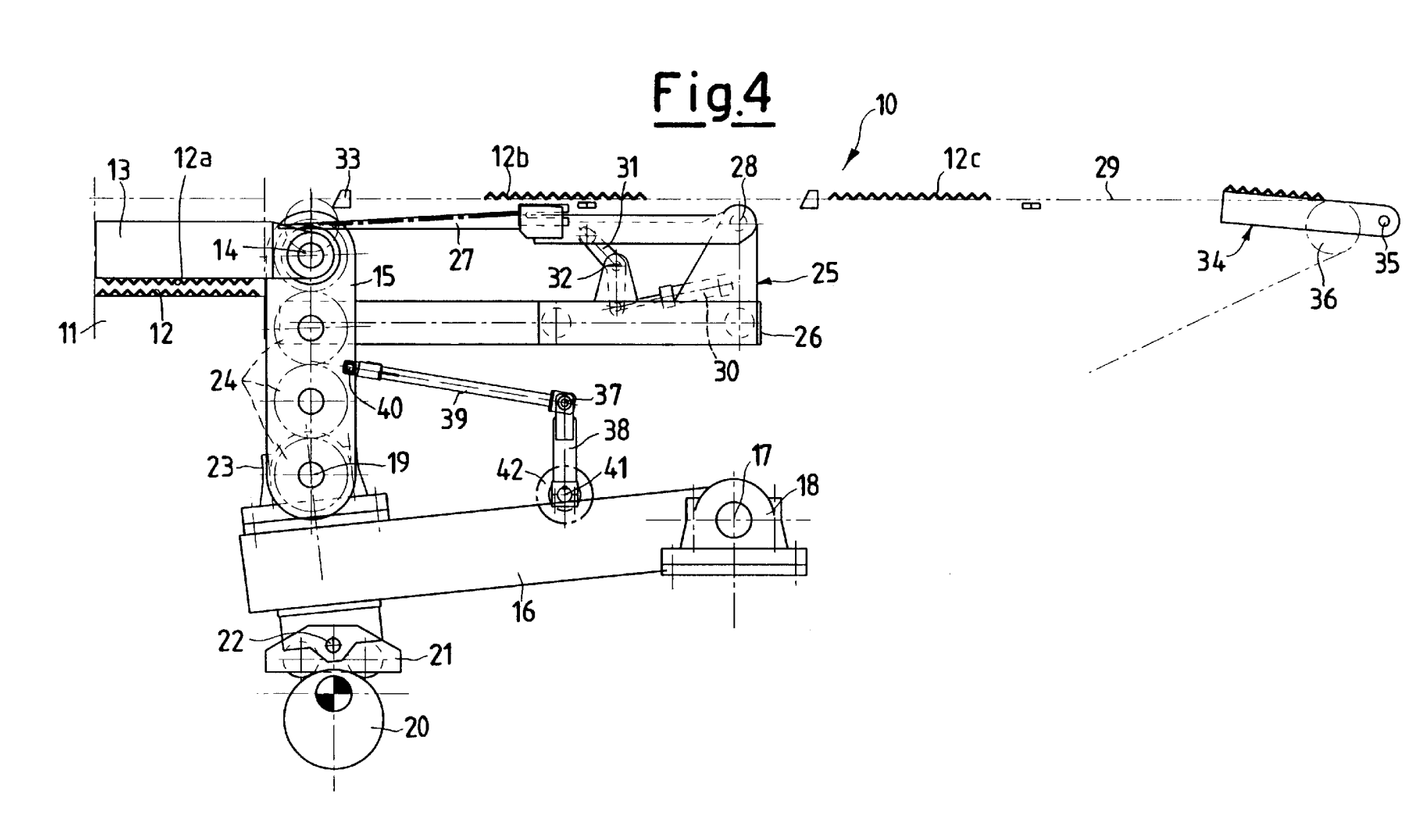

The head 13 can be actuated to rotate 180° from the position in FIG. 3 to the position in FIG. 4 and vice-versa, by a gear reducer assembly shown in a simplified manner by 23 and acting through a kinematic chain constituted by a plurality of interacting gears 24. Actuating systems of any other type may of course also be applied.

This arrangement of the gear reducer assembly 23 and gears 24 carries out a first set of actuating means to move the magnetic heads 13 from a picking-up position of a given layer of section bars to a depositing position of the same layer of section bars reversed on top of the first layer of upright section bars already positioned on the lowering device 11. In this manner the arrangement comprising the motorized cam 20 and the cam follower 21 generates a second set of actuating means to move the magnetic heads 13 in a vertical manner.

A trolley 25 can be actuated to move in the direction of the double-pointed arrow O on supporting rails 26, and carries a lance 27. More exactly, the trolley 25 can be shifted forward and backward from the reception area of layer of section bars to a deposition area of the same layer of section bars. The lance 27 cooperates with the magnetizable head 13 and oscillates at one of its extremities around a pin 28 hinged on the trolley 25. The lance 27 is capable of picking up the layers 12, 12a, 12b, etc. from a conveying line indicated in a simplified manner by 29, for example by rotating around pulleys at the extremity 36.

The conveying line 29 ends ahead of the lowering device 11 and in a position aligned with the vertical position of the arm 15.

As evidenced by the figures, the oscillation of the lance 27 around the pin 28 is commanded by an actuator 30 acting through a leverage 31 oscillating around the pin 32 also arranged onboard the trolley 25.

Reference number 33 indicates some knock-down pawls which determine the formation of the section bar layers 12, 12a, 12b, etc. along the conveying line 29, while stopping and/or allowing it to advance.

Moreover, reference number 34 indicates a table oscillating around the pin 35, on which the section bars 12, 12a, 12b etc. stop over while coming from the rolling mill, not shown.

According to the invention, two arms 38 and 39 are hinged to each other by hinge 37 and built in a telescopic manner are arranged between the arm 15 and the lever 16.

The two arms 38 and 39 are in turn hinged at their extremity in a pin 40 to the arm 15, and in a pin 41 to the lever 16. A driving system 42, such as a gear reducer, actuates the oscillation of the two arms 38 and 39.

This carries out a third set of actuating means for the oscillating motion of the magnetic heads 13, capable of speeding up the action of the stacker.

The figures in the drawings illustrate the operation of the stacker.

A first layer of section bars 12 moves forward on the conveying line 29 and the lance 27 picks-up this first layer of section bars 12 from the same conveying line 29 by an oscillating motion.

Figure 1:
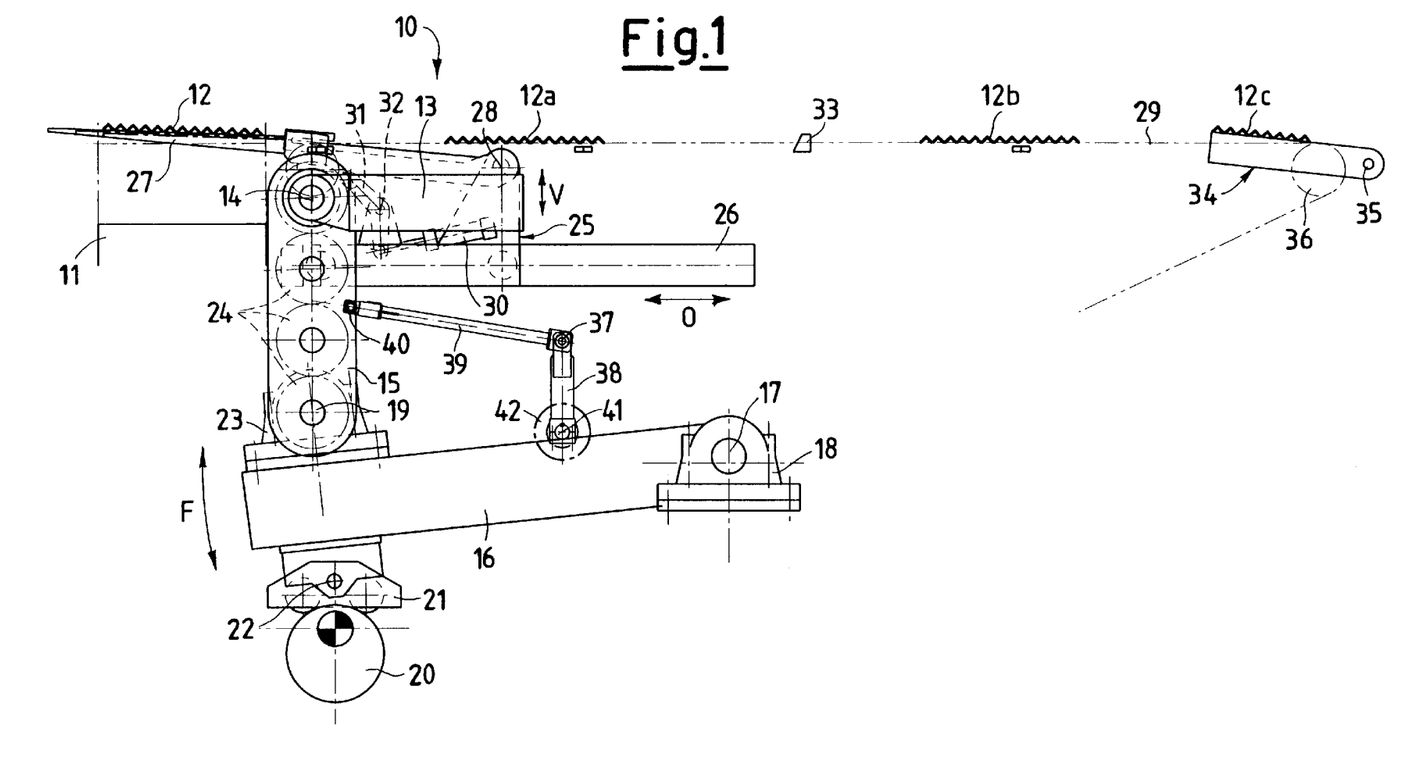
FIGS. 1–6 are simplified, vertical cross-sectional views illustrating in succession a series of various operating phases of a stacker built according to the principle of this invention.
Figure 5:
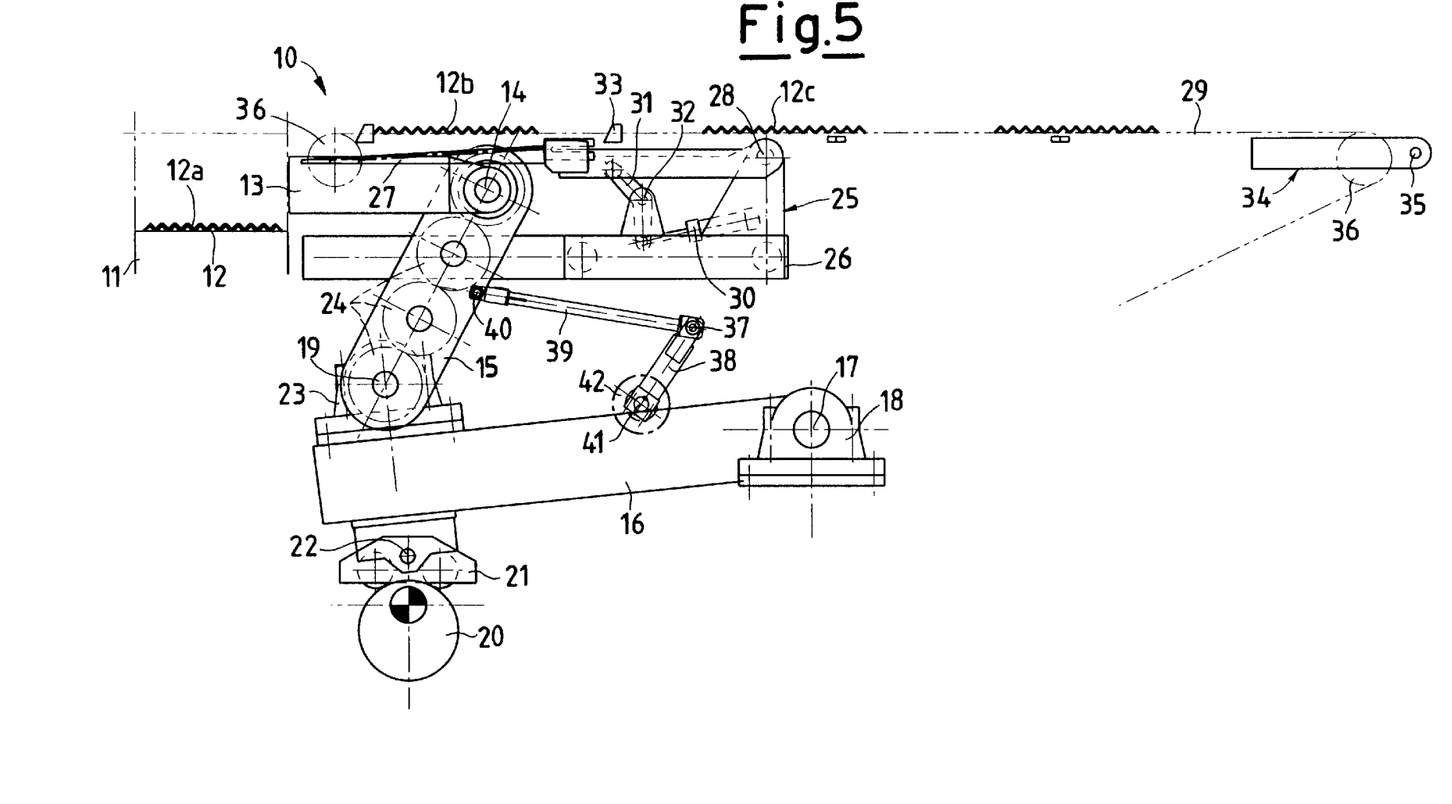
Figure 6:
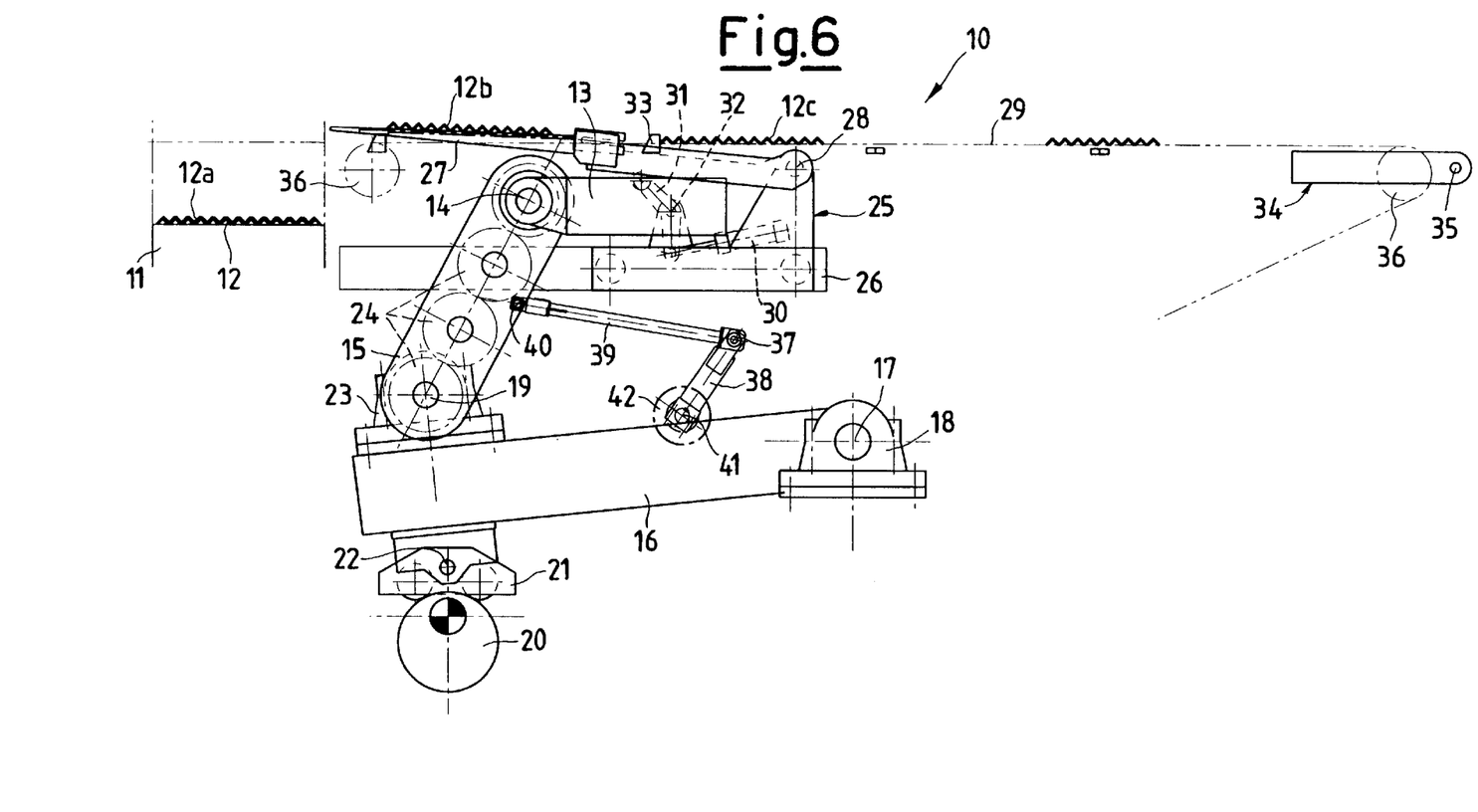

In practice and as shown in the upper part of the FIGS. 5 and 6, the lance 27 passes while oscillating from the lowered position in FIG. 5 to the raised position of FIG. 6, using the drive of the actuator 30 and the motion of the leverage 31 around the pin 32. As shown in FIG. 1, the trolley 25 then moves forward on the tracks 26, while holding the lance in a raised position.

In this manner, the lance 27 and the section bars 12 are moved out of the zone of influence of the conveying line 29, so as to be deposited in the lowering device 11 mentioned above.

Figure 2:
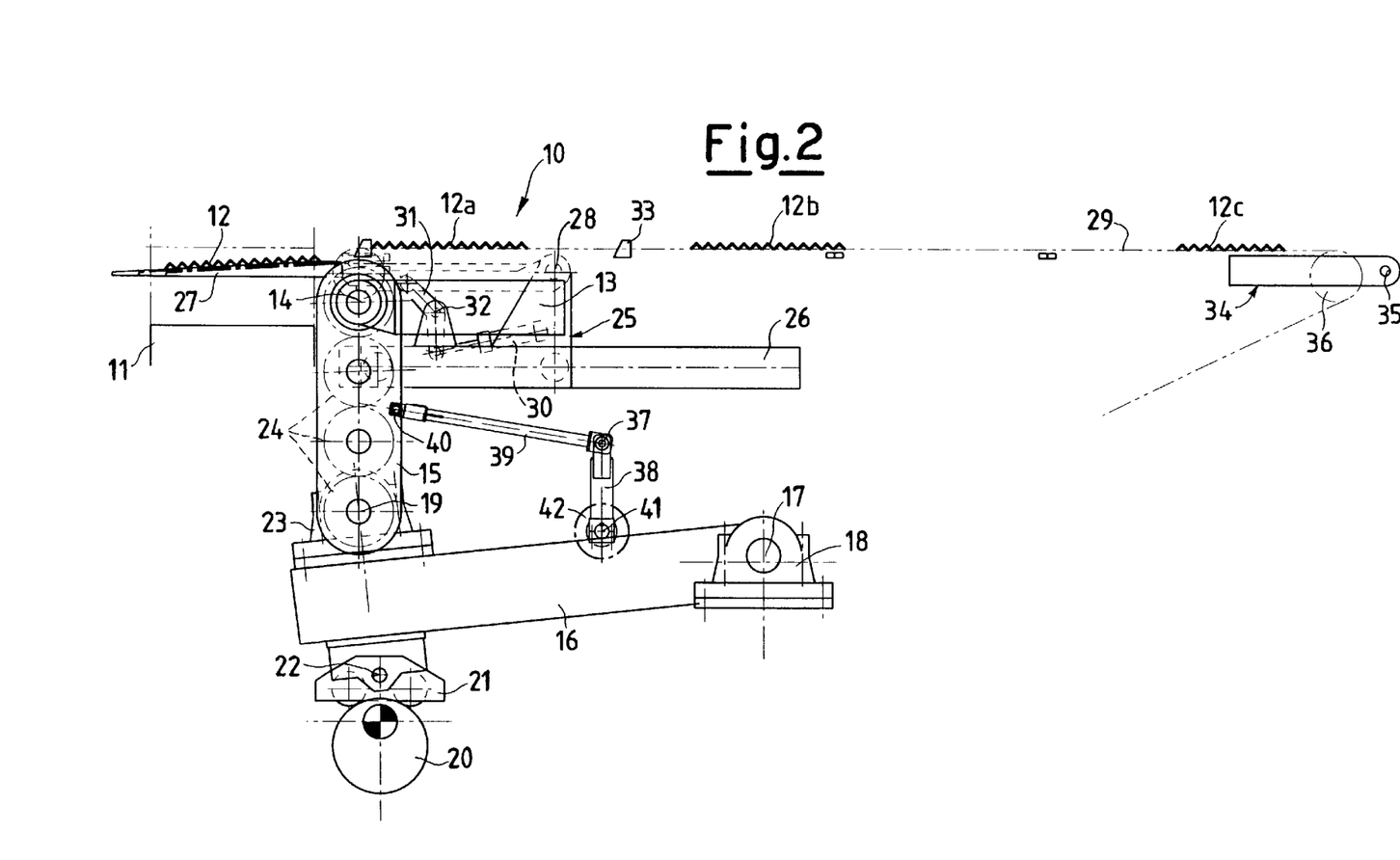

FIG. 2 shows in effect the manner in which, as a result of the lowering of the lance 27 by the actuator 30, the section bars 12 are rested on top of the lowering device 11 to form a first layer 12.

The lance lowered in this manner thus returns from the position in FIG. 2 to its original position (as shown in FIG. 3). In the meantime, the magnetized head 13 is actuated by the cam 20, aided by the lever 16 and the arm 15, to move vertically upward in the direction of the arrow V, parallel to itself. By this action, the magnetized head 13 picks up the second layer of section bars 12a formed on the conveying line 29, as clearly shown in FIG. 3.

The magnetic head 13, in a counter-clockwise rotation actuated by the motorized reducer 23 using the gears 24, subsequently reverses the section bars 12a and moves them on top of the first layer 12.

In this position above the first layer 12, the magnetic head deposits the second layer 12a thanks to its demagnetization and the eventual aid of expelling devices already known but not shown here. Simultaneously with the deposition, the cam 20 rotates and actuates the lowering of the arm 15 and of the head 13, which returns to its original lowered position (as shown in FIG. 4).

The motor 42 now springs into action, by actuating the two hinged arms 38 and 39 and oscillating the arm 15 around the pin 19, so as to return the magnetic head 13, while still rotated in a depositing position, to a pulled-back position (FIG. 5).

The actuator 30 immediately rotates the lance 27 to pick up the section bars 12b (as in FIG. 6), which go to form the third layer on the lowering device 11.

At this point, the previous operating cycle is repeated, while the magnetic head 13, by a further counter-clockwise rotation again actuated by the motorized reducer 23 aided by the gears 24, reverses and reverts to its initial position.

In this position, after being returned to its initial vertical position by the motor 42 and the telescopic arms 38 and 39, the magnetic head is ready to pick up the section bars 12c moving forward on the conveying line 29, and to move them on top of the third layer of section bars 12b.

Figure 7:
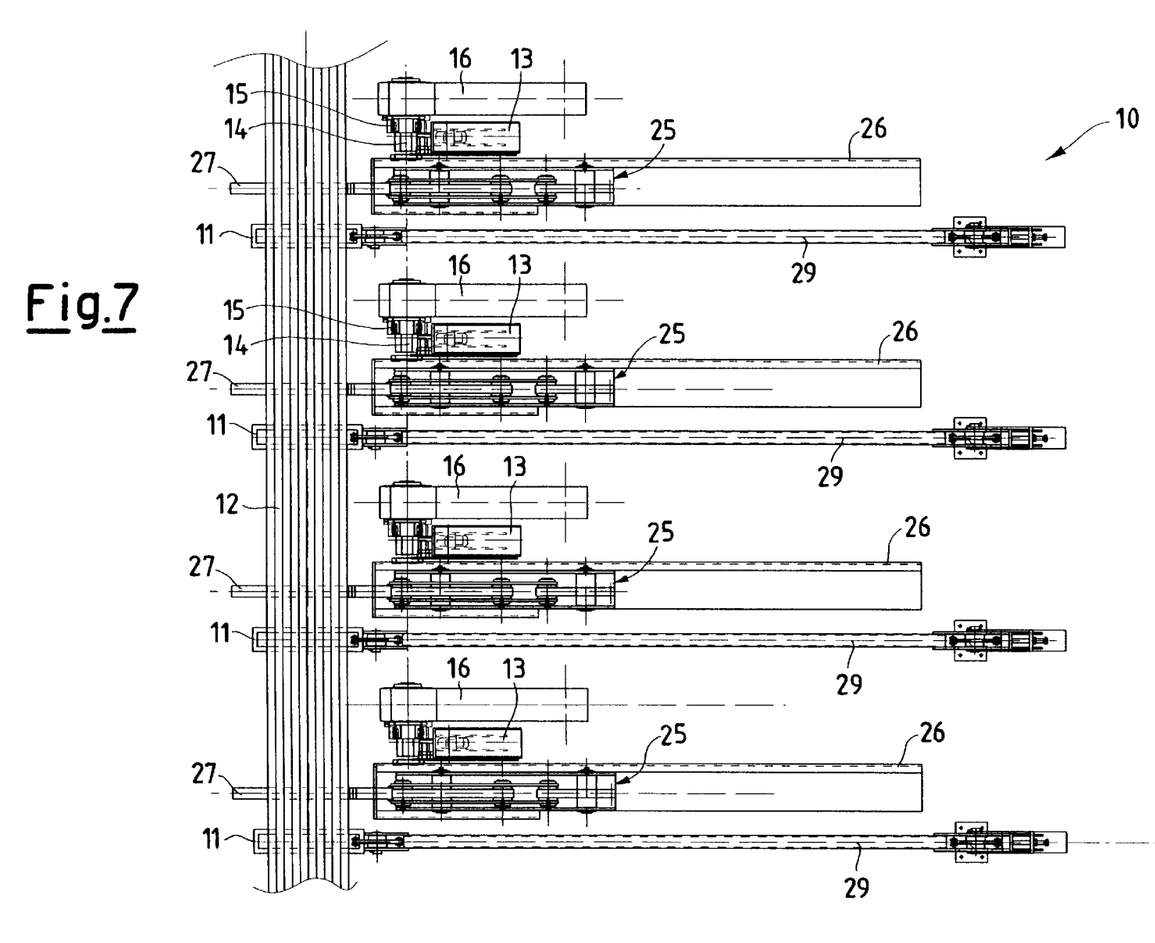
FIG. 7 shows a plan view of the stacking complex of the foregoing figures, according to the invention.

The picking-up operations with the aid of the lances 27 and heads 13 shown in a plan view in FIG. 7 continue and thus repeat the operating cycles until completing the desired stack, which is then packed in a manner already known.

In the stacker according to the invention it is worth highlighting the structural and operating simplicity of the various separate kinematic elements which actuate the correct sequence in a vertical motion of the head 13 in the direction of the arrow V, its rotation and final oscillation.

In this manner the section bars 12a, 12c etc. of the conveying line 29 are picked up, reversed and moved exactly on top of the last layer placed on the lowering device 11. Moreover, the section bars are deposited by a motion along an axis perfectly perpendicular to the plane on which the layers are resting, thus favoring the proper stacking of section bars of a most diverse configuration, including those difficult to interconnect with each other.

This achieves the scopes mentioned in the first part of the description for the production of a stacker of compact size and fitted with a very simple magnet head controlling system.

The stacker of this invention is therefore economical and the various layers of section bars are deposited in a smooth, precise and rapid manner, one above the other on top of the lowering device, while preventing any jamming or interference.

Obviously, the embodiments of the stacker may differ from the one shown for exemplifying and non-limiting purposes.

The range of protection of the invention is in any case circumscribed by the attached claims.

We claim:

1. Stacker for the stacking of metallic section bars in alternating upright and reverse layers and in an orderly manner, in particular of metallic section bars originating from a rolling mill by a conveying line, comprising;

a plurality of trolleys equipped with lances for being moved forward and backward from a reception area of a layer of section bars to a deposition area of the same layer of section bars in an upright position, and a plurality of magnetic heads actuated to rotate with the aid of a first set of actuating members from a picking-up position of another layer of section bars to a depositing position of the same layer of section bars reversed on top of the first layer of upright section bars, wherein each head performs both a vertical shifting motion and an oscillating motion, said shifting motion being actuated by a second set of actuating members independent of the first set and said oscillating motion being actuated by a third set of actuating members independent of the first set and wherein said first set of actuating members comprise a plurality of interacting gears.

2. Stacker according to claim 1, wherein said third set of actuating members comprise a pair of arms hinged on one side to a lever and on a second side to an additional arm carrying said head, wherein said lever is actuated to oscillate by a cam and said arm is hinged to said lever.

3. Stacker according to claim 1, wherein said second set of actuating members comprise a lever carrying said head actuated to oscillate by a cam.

4. Stacker according to the claim 2, wherein said head is mounted on said additional arm, said additional arm extending to a first extremity of said lever which is at its opposite extremity hinged to a support.

5. Stacker according to the claim 2, wherein said cam actuates the oscillation of the lever by a cam follower on the lever, in a position underlying said additional arm which extends vertically and carries said head at a free extremity thereof.

6. Stacker according to claim 2, wherein said additional arm carries said first set of actuating members for rotation of the head.

* * * * *